Oct. 21, 1952 R. KEITLEY 2,615,091
SCREENED HIGH-FREQUENCY CIRCUIT ELEMENT
Filed Nov. 26, 1948
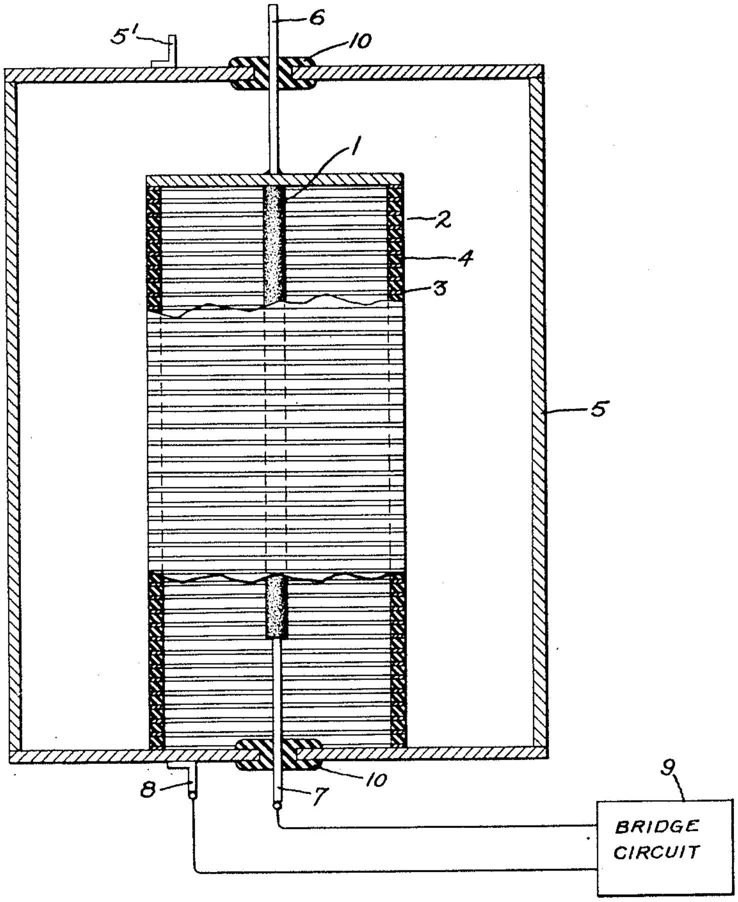
Inventor:
Robert Keitley,
by Richard E. Hosley
His Attorney.

Patented Oct. 21, 1952 2,615,091

UNITED STATES PATENT OFFICE 2,615,091

SCREENED HIGH-FREQUENCY CIRCUIT ELEMENT

Robert Keitley, Rugby, England, assignor to General Electric Company, a corporation of New York Application November 26, 1948, Serial No. 61,983
In Great Britain November 14, 1947

2 Claims. (Cl. 178—44)

This invention relates to means for the avoidance of the effects of stray capacitance met with in circuit elements used at high frequencies, and more particularly to a screened high frequency circuit element.

The distributed stray capacitances between different points along such an element and to neighboring objects results in the flow of appreciable capacitance currents at high frequencies which disturb the potential and current distribution along the elements.

Owing to the distributed nature of this stray capacitance no equivalent circuit consisting of a finite number of inductive, resistive or capacitive elements may be used to represent such an element, nor can such a circuit be used to balance out the errors introduced by this stray capacitance exactly at more than a single frequency.

The object of the present invention is to provide a means of screening whereby those stray capacitance effects may be eliminated.

Avoidance of stray capacitance currents at different points along an extended circuit element or assembly of circuit elements subjected to a potential gradient of uniform or non-uniform character is achieved, according to the invention by enclosing the circuit element or assembly in a screen having conducting terminals at least one of which is electrically connected to a terminal of the element or assembly, the screen being so constructed that the potential gradient developed along it between its terminals corresponds with that developed along the circuit element or assembly in the absence of any capacity currents.

To enable the screen to produce the desired potential gradient, simulating that developed along the circuit element or assembly, the screen may be composed of a material having substantial electric impedance to electric currents at the frequency of the signal voltage applied to the circuit element. The impedance material of the screen may be conducting and/or insulating but is preferably a combination of conducting and/or insulating elements suitably related to one another. Thus where the circuit element is such that, in the absence of stray capacitance currents, a uniform potential gradient normally exists, the screen may consist of a sheet of material having a high dielectric constant with metal plates at each end to which the potentials are applied. If the material is of high enough dielectric constant and of thickness suitably graded along its length the potential gradient inside such a screen may be matched to that of the element to be screened. A similar effect may be attained by composing the screen of short sections of dielectric and metal along its length. The composite screen, if the sections are short enough, thus behaves on average like a screen of higher dielectric constant.

Alternatively the screen may take the form of a closely wound coil of wire of suitably graded number of turns per unit length.

The screen may be surrounded by an earthed metal screen to isolate the electric fields from external disturbance, allowance being made in the proportioning of the inner screen for the disturbing effect of the earthed screen so that the desired potential gradient is maintained.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which the single figure represents a sectional view of a resistor screened in accord with the invention.

The arrangement illustrated is for the screening of a cylindrical rod resistor 1. The screen 2, provided in accordance with the invention, consists of alternate layers of metal 3 and dielectric 4. The whole is enclosed by an earthed metal shield can or screen 5. The input terminal to the resistor is at 6 and the input voltage is applied between terminal 6 and the earthed metal screen at 5'. The output terminal is at 7 and output to component 9 is taken between terminal 7 and the earthed metal screen at 8. Insulators 10 isolate the terminals of resistance 1 from screen 5. The screen 2 is so constructed that the potential gradient at all points matches that of resistor 1, screen 2 being extended beyond resistor 1 at the output end to allow for the potential drop across 9. The relationship that exists between the resistor 1 and screen 2 is such that starting from points on each lying in a plane normal to the resistor axis, measuring the impedance gradient as a percentage of the total impedance of each respective branch, the impedance gradients to similarly related second points spaced along the resistor and screen are equal. In other words, the percentage of the total impedance of screen 2 represented by any unit distance along screen 2 is equal to the percentage of the total impedance through resistor 1 and the external apparatus 9 represented by the same unit distance along resistor 1, the units of distance being directly opposite each other; that is, the starting point of the unit along the screen is in a plane normal to the resistor at the starting point thereon, and the end points are in a similar plane.

In one application of this arrangement, component 9 is a current measuring rectifier bridge whose impedance is low but not constant. In such cases the resistor and screen potential gradients cannot match exactly at all values of the impedance of 9 and the uniform longitudinal flow of the electric field between disc 4 and resistor 1 will be disturbed. The effects of this disturbance may be minimized by using the largest possible diameter for the screen 2 relative to that of the element to be screened.

While the screen 2 may take a relatively heavy capacitance current, this passes direct to the earthed metal screen 5 without affecting the resistor 1 to be screened.

In the application considered, in the absence of the screening according to the invention, stray capacitances may cause serious frequency errors which are eliminated or greatly reduced in accord with the invention by the use of screen 2.

The invention finds particular utility in connection with potential dividers. Where high frequency operation only is required, a capacitance potential divider is satisfactory and stray capacitances may be considered as part of the main capacitances. Where the voltage division is required at low frequency, a resistance potential divider may need to be used because of the excessive size of the capacitances which would be needed for a capacitance divider while for D. C. operation a resistance divider is of course essential.

At high frequencies, however, large errors will be caused by the stray capacitances of the resistance divider which cannot be corrected by the use of a capacitance divider in parallel since the equivalent stray capacitances of the resistance divider vary with frequency.

However, by the use of two resistors, screened in the manner previously described whose screen capacitances are arranged to be inversely as their resistances, a divider may be constructed whose voltage division ratio is unchanged from D. C. up to the highest frequencies for which capacity dividers may be constructed.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. A screened resistive circuit element adapted for use at different frequencies comprising an elongated resistor extending between terminal end portions, a conductive disc connected to one of said portions and extending perpendicularly from said resistor around said one portion, a hollow cylindrical member comprising at least two conductive plates separated by a dielectric material and being of an outside diameter substantially equal to that of said disc arranged to contact said disc at a peripheral portion thereof and substantially coaxially to surround said resistor, the axial length of said member being greater than that of said resistor whereby said member extends beyond the other of said end portions, an electrode for the extending end of said member, an impedance connecting said other terminal portion to said electrode, and means to apply a signal voltage between said one terminal portion and said electrode, said impedance and the extending portion of said member being relatively proportioned to provide equal signal voltages at the said other terminal portion and at that portion of said member lying in a plane perpendicular to the axis of said resistor at said other end, and said resistor and said screen being relatively proportioned for the coextensive portions to provide substantially equal potential gradients therealong throughout said coextensive portions thereby to reduce capacity effects at high frequencies.

2. A screened resistive circuit element adapted for use at different frequencies comprising an elongated resistor extending between terminal end portions, a conductive disc connected to one of said portions and extending perpendicularly from said resistor around one portion, a hollow cylindrical member comprising a plurality of conductive plates separated by a dielectric material and being of an outside diameter substantially equal to that of said disc arranged to contact said disc at a peripheral portion thereof and substantially coaxially to surround said resistor, the axial length of said member being greater than that of said resistor whereby said member extends beyond the other of said end portions, an electrode for the extending end of said member, an impedance connecting said other terminal portion to said electrode, means to apply a signal voltage between said one terminal portion and said electrode, said impedance and the extending portion of said member being relatively proportioned to provide equal signal voltages at the said other terminal portion and at that portion of said member lying in a plane perpendicular to the axis of said resistor at said other end, and said resistor and said screen being relatively proportioned for the coextensive portions to provide substantially equal potential gradients therealong throughout said coextensive portions thereby to reduce capacity effects at high frequencies, and a conductive externally-disposed shield for said member.

ROBERT KEITLEY.

REFERENCES CITED

The following references are of record in the file of this patent:

UNITED STATES PATENTS

| Number | Name | Date |
|---|---|---|
| 1,578,977 | Frasse | Mar. 30, 1926 |
| 1,868,962 | Atkinson | July 26, 1932 |
| 2,064,831 | Hawksley | Dec. 22, 1936 |
| 2,068,624 | Atkinson | Jan. 19, 1937 |
| 2,115,826 | Norton et al. | May 3, 1938 |
| 2,220,539 | Panov et al. | Nov. 5, 1940 |
| 2,435,597 | Moullin | Feb. 10, 1948 |
| 2,441,047 | Wall | May 4, 1948 |